INVENTOR
RAY C. WETZEL
BY Allen Z. Botney
ATTORNEY

United States Patent Office 3,443,764
Patented May 13, 1969

3,443,764
FOOD-WASTE DISPOSAL APPARATUS
Ray C. Wetzel, 15123 Boca Chica Drive,
La Mirada, Calif. 90638
Filed June 6, 1966, Ser. No. 555,605
Int. Cl. B02c 18/42
U.S. Cl. 241—46                                             4 Claims

ABSTRACT OF THE DISCLOSURE

This invention provides improvements in garbage disposers in the form of adjustable bearings and water-sealing apparatus. The bearings materially simplify the overall construction and assembly of these disposers, and the water-sealing apparatus is very effective in protecting the motor and other elements that could be damaged or adversely affected by the water used in the garbage disposing process.

---

Figure 1:
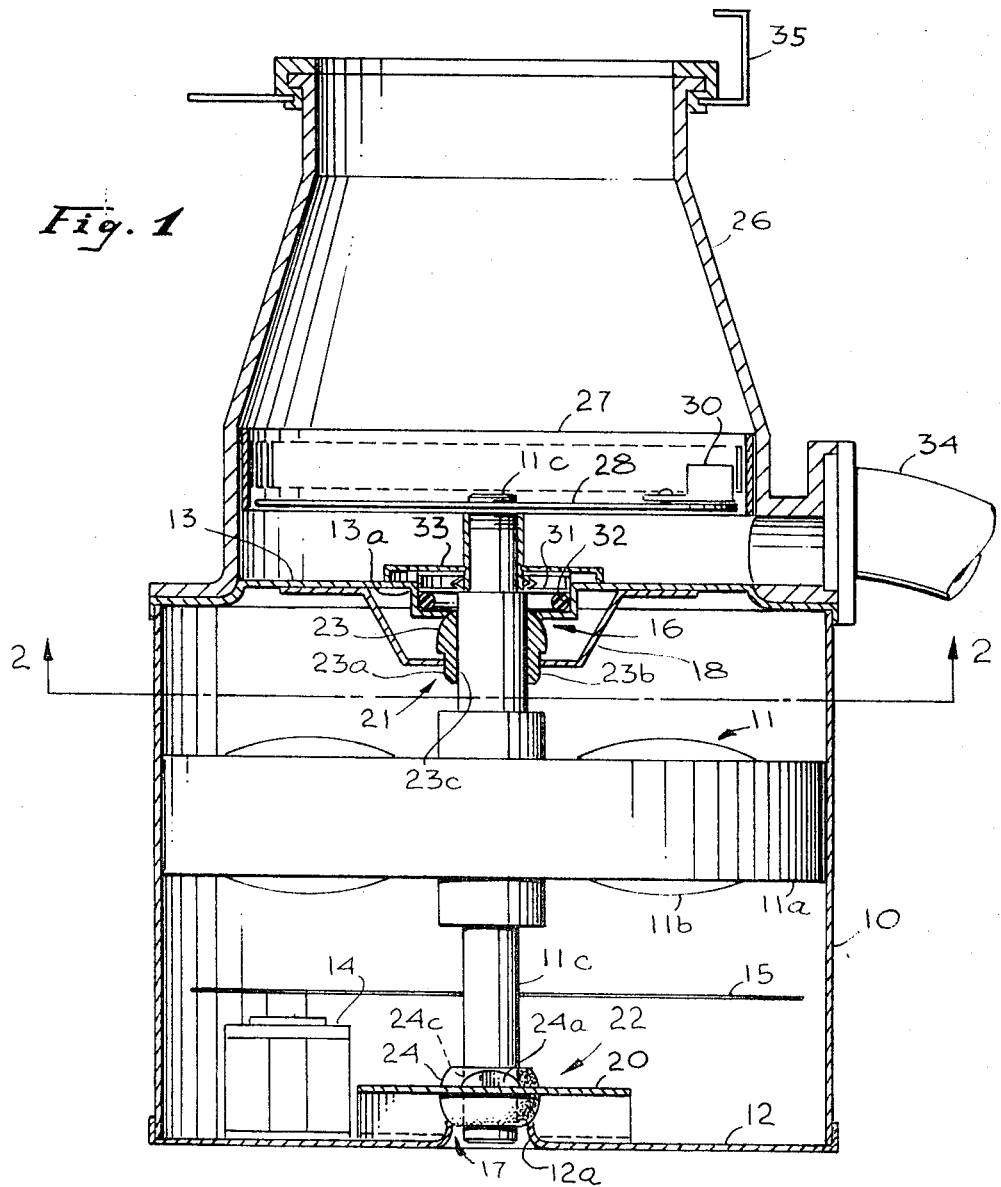

The present invention relates to food-waste disposer units in general and more particularly relates to an improved internal construction for the grinding section of such units.

As is well known, garbage disposal units are relatively complex pieces of equipment in that they involve the co-operation of a considerable number of parts for the ultimate purpose of comminuting waste material. Consequently, any technique that makes it possible to reduce the total number of parts or to simplify the manufacture and assembly of these units must be considered as a material improvement in this field. More particularly, in the prior art, disposal units are generally constructed to have a center housing section that houses not only the bearing and the water seal for the bearing, but oftentimes the cutting mechanism as well. Such central sections are cast as a unit, with the result that they suffer from certain disadvantages, such as, for example, high cost of manufacture, an undesirably high number of bearing failures because of the exposure of the bearings to hot water with this kind of construction and, because of the rigidity of the bearing construction, bearing alignment difficulties are usually encountered. An example of such a center housing section may be seen in the patent to George D. Gebhart entitled "Food-Waste Reduction Devices," Patent No. 2,772,836 issued Dec. 4, 1956.

The present invention overcomes these earlier disadvantages and it does so, first, by providing bearings that are somewhat adjustable in nature and, second, by mounting these bearings in such a manner as to materially simplify the overall construction of the disposers. As a result, not only are fewer parts involved but assembly of them is also facilitated, thereby producing a significant saving in the cost of manufacture of such units, as well as in their maintenance.

It is therefore an object of the present invention to eliminate the casting of such center housing sections for waste disposal units.

It is another object of the present invention to provide a water seal for the bearings in waste disposal apparatus that will materially increase the life of such elements.

It is a further object of the present invention to provide a bearing structure that will eliminate alignment problems.

It is an additional object of the present invention to provide a structural arrangement for the bearings in a food-waste disposer that will provide an effective water seal for the bearings, allow for their proper alignment, and at the same time reduce the manufacturing costs of such equipment.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
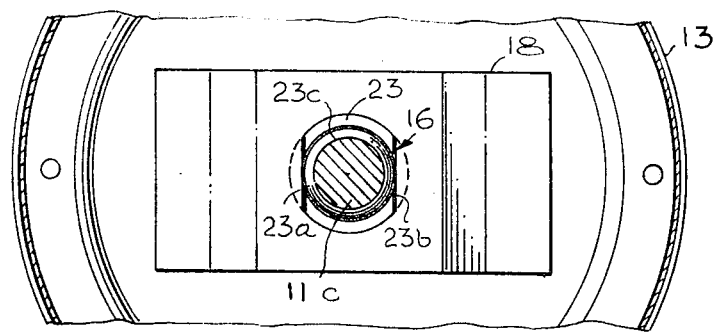

FIGURE 1 is a front view, in cross-section, of the internal construction of a food-waste disposal unit according to the present invention; and FIGURE 2 is a cross-sectional view of the FIG. 1 apparatus taken along the broken line 2—2 and in the direction of the arrows thereof.

For a detailed description of the invention, reference is now made to the drawing wherein like or similar parts or elements are similarly designated in the figures. In FIG. 1, the embodiment is shown to include a cylindrically-shaped motor housing section 10 which, as its name implies, is designed to house the disposal motor and its auxiliary apparatus. The motor, generally designated 11, is a conventional type motor and, therefore, basically comprises a stator 11a and a rotor 11b rotatably mounted within the stator, a motor shaft, designated 11c, extending from the rotor in a direction that is perpendicular thereto. As may be seen from the figure, the motor is mounted between a bottom plate 12 and a top or center plate 13. Although not a part of the invention, the figure nevertheless shows an overload-relay device 14 that is mounted inside the housing and onto the bottom plate, another plate 15 to protect this relay device preferably being mounted above it. As is well known by those skilled in this art, the motor housing and the top and bottom plates enclosing this section are preferably made of metal.

Plates 12 and 13 respectively have a pair of openings 17 and 16 through them that are preferably of identical configuration and which are in registration with each other. These openings are centrally located on the plates and, as is clearly shown in FIG. 2 wherein center plate 13 is illustrated, they are also generally rectangular in shape, with two of the edges of each opening being straight or linear and parallel to each other, and the other two being circularly arced. The reason why each of said openings 16 and 17 has a pair of straight and parallel edges will become clearer later. As shown in the figure, a pair of bearing covers 18 and 20 are respectively mounted on plates 13 and 12, on the inside surfaces thereof, and over openings 16 and 17, each bearing cover having a circular opening through it that is coaxially aligned with the opening through the plate on which it is mounted. Thus, the opening through bearing cover 18, designated 21, faces opening 16, and the opening through bearing cover 20, designated 22, faces opening 17, all four openings being coaxially aligned.

A bearing 23 is mounted between center plate 13 and bearing cover 18 in openings 16 and 21 thereof and, similarly, a bearing 24 is mounted between bottom plate 12 and bearing cover 20 in openings 17 and 22 thereof. As may be seen from the figures, bearings 23 and 24 are horizontally flat on top and bottom but spherical in between, except for parallel flat surfaces cut vertically into the forward portion of each of the bearings. These flat surfaces are commonly referred to as "flats." In bearing 24, the "flats" are designated 24a and 24b, and extend downwardly from the top surface of the bearing, whereas in bearing 23, they are designated 23a and 23b and extend upwardly from the bottom surface of the bearing. Thus, as may be seen from FIGS. 1 and 2, the top or forward portion of bearing 23 conforms, in its configuration, to the shape of opening 16 in center plate 13, and its bottom portion conforms, in its configuration, to the shape of opening 21 in bearing cover 18. Likewise, the bottom portion of bearing 23 conforms, in its configuration, to the shape of opening 17 in center plate 12, and its top portion conforms, in its configuration, to the shape of opening 22 in bearing cover 20.

More specifically, directing attention to the flat bottom surface of bearing 23, which is the view presented in FIG. 2, the bottom portion of the bearing is generally of rectangular shape, with two sides straight and parallel and the other two circularly arced. Consequently, when this bottom portion of bearing 23 is fitted into opening 21, the bearing is thereby prevented from rotating. The same is true with respect to the top portion of bearing 24, with the result that it, too, is prevented from rotating, once it is fitted into opening 22. As for openings 16 and 17 in the center and bottom plates, the bottom portion of bearing 24 rides on the edge of opening 17, and the top portion of bearing 23 rides on the edge of opening 16, with the result that the plates thereby prevent the bearings from slipping out of openings 21 and 22 in the bearing covers. It should be mentioned here with emphasis that although bearings 23 and 24 are prevented from rotating, the tolerances between the bearing and the plate openings are intentionally made large enough so that the bearings can be "wobbled" slightly to overcome any misalignment problems that may be encountered. In this regard, bearings 23 and 24 respectively have axial openings 23c and 24c through them in which the shaft of motor 11 is to be mounted for rotation, as will be seen below.

Considering plates 12 and 13 somewhat further, it should be mentioned that plates 12 and 13 are constructed so as to respectively include as an inherent part thereof recesses 12a and 13a at their centers, the recess being disposed in an inward direction and preferably of a circular configuration. As may be seen from the figures, openings 16 and 17 are located at the center of these recesses. With respect to recess 12a, its depth is related to the dimensions of bearing 24 and bearing cover 20 such that the flat bottom surface of bearing 24 is substantially flush with the recessed surface of plate 12. With respect to recess 13a, its depth is similarly related to the dimensions of bearing 23 and bearing cover 18, such that the flat top surface of bearing 23 is also substantially flush with the recessed surface of center plate 13. Plate recess 12a is desirable because motor shaft 11c may, upon assembly of the disposer unit, actually protrude somewhat from bearing 24, as is shown in the figure, and the recess is intended to take care of this contingency by keeping the end of the shaft from being exposed beyond the boundary of the plate. Thus, this recess provides an additional safety feature to the unit. As for recess 13a, it is used not only to help seat the bearing, but it also provides a most convenient means for mounting a water seal around the motor shaft, as will be described below.

Just as plate 12 encloses cylindrical housing 10 on the bottom, center plate 13 encloses this housing at its top, with motor shaft 11c extending through recess opening 16 into a hopper 26 where a cutter ring 27 and a fly wheel 28 are mounted on the upper end of shaft 11c, an impeller or flipper element 30, one of several, being mounted at several different points along the periphery of the fly wheel. In recess 13a and around shaft 11c is a water seal 31 mounted on an O-ring 32, the water seal, as its name implies, being used to prevent water from passing through the recess opening to the motor apparatus below. Above the recess and covering it like an umbrella is a disc-shaped member 33 that spins with the shaft, this spinning action of the member helping, because of the centrifugal forces generated, to ward off the water that falls or spills on it, and thereby helping to maintain the water seal. The water itself ultimately leaves this section by means of a pipe 34 mechanically coupled to the hopper.

Hopper 26 is mounted on center plate 13 along the periphery thereof, a hook-up ring 35 being mounted at its mouth or upper end by means of which the hopper and, therefore, the entire disposer unit, as it is shown in FIG. 1, can be firmly linked or coupled to the sink flange assembly rigidly mounted to the sink (not shown).

Finally, it should be mentioned that although a particular arrangement of the invention has been illustrated and described above, by way of example, it is not intended that the invention be limited thereto. Accordingly, the invention should be considered to include any and all modifications, alterations, or equivalent arrangements falling within the scope of the annexed claims.

Having thus described the invention, what is claimed is:

1. In a food-waste disposer unit, the combination comprising: a cylindrically-shaped motor housing section having a bottom plate covering one end thereof and a top plate covering the other end thereof, said plates respectively having inwardly disposed recesses therein at the centers thereof and coaxially aligned openings therethrough at the centers of said recesses, each of said openings having at least one straight edge; a motor mounted in said housing section between said top and bottom plates, the shaft thereof extending into said plate openings; and means respectively mounted in and about said plate openings for rotatably mounting said motor, said means including a pair of bearings respectively mounted in and partially extending through said plate openings, the forward portion of each of said bearings having at least one flat surface that conforms to the straight edge of said plate openings, the forward portions of said bearings respectively passing through said plate openings with the flat surfaces and straight edges thereof being alongside one another.

2. The combination defined in claim 1 wherein said bearings and plates are adapted to enable said bearings to wobble slightly in their plate mountings to permit their axial alignment with one another.

3. The combination defined in claim 1 wherein said combination further includes a water seal mounted in the recess of said top plate and around the motor shaft extending therethrough, said water seal being adapted to repel water incident thereon, thereby to prevent water from passing through said top plate and into said motor housing section.

4. The combination defined in claim 1 wherein said combination further includes water-sealing apparatus mounted in the recess of said top plate between the walls of said recess and motor shaft, said water-sealing apparatus including a bushing mounted on the shaft, an O-ring on the floor of said recess along the periphery thereof, a water-seal element on said O-ring between said bushing and the wall of said recess, and an umbrella element that covers said recess mounted on said shaft above said bushing, said umbrella element spinning with said shaft to centrifugally eject water falling thereon.

References Cited

UNITED STATES PATENTS

| | | |
|---|---|---|
| 2,138,716 | 11/1938 | Truitt. |
| 2,212,883 | 8/1940 | Meeker _____ 241—257 X |
| 2,710,035 | 6/1955 | Plummer. |
| 3,171,605 | 3/1965 | Knapp _____ 241—257 |

HARRISON L. HINSON, *Primary Examiner.*